(12) United States Patent
Bishop et al.

(10) Patent No.: US 12,451,675 B1
(45) Date of Patent: Oct. 21, 2025

(54) METHOD AND APPARATUS FOR FINISHED INSTALLATION OF ELECTRICAL BOX OUTLET FLUSH IN A CONCRETE WALL

(71) Applicant: BOCCI DESIGN & MANUFACTURING, INC., Vancouver (CA)

(72) Inventors: Randall Bishop, Vancouver (CA); Patrick Mulcahy, Vancouver (CA)

(73) Assignee: BOCCI DESIGN & MANUFACTURING, INC., Vancouver (CA)

( * ) Notice: Subject to any disclaimer, the term of this patent is extended or adjusted under 35 U.S.C. 154(b) by 0 days.

(21) Appl. No.: 19/183,145

(22) Filed: Apr. 18, 2025

Related U.S. Application Data (60) Provisional application No. 63/636,225, filed on Apr. 19, 2024.

(51) Int. Cl.
*H02G 1/00* (2006.01)
*H02G 3/08* (2006.01)

(52) U.S. Cl.
CPC ................................. *H02G 1/00* (2013.01)

(58) Field of Classification Search
CPC ............ H02G 3/08; H02G 3/081; H02G 3/10; H02G 3/12; H02G 3/121; H02G 3/123; H05K 5/00; H05K 5/02; H05K 5/0217; H05K 5/0247; H05K 5/03; H01R 13/46; H01R 13/5202; H01R 13/5213; H01R 13/53; H01R 13/533

USPC ....... 174/480, 481, 50, 53, 57, 58, 559, 535, 174/61, 63, 520; 220/3.2–3.9, 4.02; 361/600, 601; 52/220.1, 220.8; 248/906

See application file for complete search history.

(56) References Cited

U.S. PATENT DOCUMENTS

| | | | | |
|---|---|---|---|---|
| 2,652,168 A | * | 9/1953 | Nelson ...................... | B28B 7/32 220/3.4 |
| 3,518,331 A | * | 6/1970 | Marin ..................... | H02G 3/121 264/275 |
| 5,257,487 A | * | 11/1993 | Bantz ..................... | H02G 3/283 220/3.6 |
| 5,778,625 A | * | 7/1998 | Druffel .................... | H02G 3/20 174/480 |
| 5,831,212 A | * | 11/1998 | Whitehead ............. | H02G 3/121 174/50 |

(Continued)

*Primary Examiner* — Angel R Estrada
(74) *Attorney, Agent, or Firm* — FisherBroyles, LLP; Susan M. Oiler (57) ABSTRACT

Systems for mounting an electrical junction box in a concrete structure and methods of making concrete structures with such electrical junction boxes molded therein are disclosed. The system includes a secondary plate configured to be mounted to a closure plate of an electrical junction box, a removable blank seated in the second through hole, and a bolt extending through the removable blank. The removable blank protrudes forward a distance sufficient to mount to a concrete form. The secondary plate has a forward protruding flange defining a second through hole aligned with the first through hole and a rear surface of the secondary plate comprises a recess therein that extends from the second through hole in a radial outward direction and the bolt terminates with a foot and the recess of the secondary plate is shaped to receive the foot to define a latched position for the removable blank.

20 Claims, 10 Drawing Sheets

(56) References Cited

U.S. PATENT DOCUMENTS

| | | | |
|---|---|---|---|
| 7,038,130 B2 * | 5/2006 | Yip, Jr. ............... | H02G 3/121 220/3.9 |
| 7,449,633 B2 * | 11/2008 | Lalancette ............ | H02G 3/121 174/57 |
| 8,661,666 B2 * | 3/2014 | Grady ................... | H02G 3/086 174/486 |
| 8,759,676 B1 * | 6/2014 | Gretz .................... | H02G 3/185 174/50 |

* cited by examiner

METHOD AND APPARATUS FOR FINISHED INSTALLATION OF ELECTRICAL BOX OUTLET FLUSH IN A CONCRETE WALL

RELATED APPLICATIONS

This application claim the benefit of U.S. provisional application Ser. No. 63/636,225, filed Apr. 19, 2024, the entirety of which is incorporated herein by reference.

TECHNICAL FIELD

The present invention relates generally to electrical junction and outlet boxes, such as are used for installation of electrical outlets and light switches, and, more particularly, to a method and apparatus that enables such boxes to be installed in a concrete wall in manner to receive the electrical outlets or light switches flush in the concrete wall, ideally without the need for a cover plate.

BACKGROUND

Electrical outlet boxes (sometimes also referred to herein as junction boxes) are a ubiquitous feature of modern residential and commercial construction. Typically, the outlet box encloses one or more electrical outlets or switches, to which wires are run from within the surrounding wall structure, although in some instances sensors, lights and other components may be mounted in the outlet boxes; use with all such devices is contemplated by the present invention, and the term "outlet box" applies regardless of whether the device mounted therein is in an electrical outlet or serves some other function.

Despite advances in other areas of technology, electrical outlet boxes have remained little changed for at least the better part of a century. As is well known, outlet boxes ordinarily take the form of a shell (typically rectangular, although in some instances being hexangular or having other shapes) that is open at the front. The outlet box is nailed to a stud or otherwise mounted to the internal structure of a wall, with the open side facing toward the front. Wires are routed to the box and attached to the electrical outlet, switch or other component, which is then installed within the interior of the box. The open front of the box is then closed by a cover plate, having one or more openings through which the operative portion of the outlet, switch or other component protrudes.

This type of installation has been used for so many years that, from an aesthetic standpoint, most people now simply accept the presence of visible cover plate as a necessary evil. Of course, numerous efforts have been made to improve the appearance of outlet box covers, but with very mixed results: At best, they have turned the cover plate into a more or less decorative article, while at worst, they have produced an even more pronounced eyesore; in recent years, the trend has been to simply make the cover plate plain and utilitarian in appearance, in an effort to minimize its visual impact as much as possible.

The cover plates of conventional outlet boxes therefore exist as visual distractions in otherwise attractively finished interiors, both residential and commercial. While the problem is perhaps most pronounced in high-end construction, where a refined appearance is sought, even modest homes could benefit aesthetically from the elimination of visible cover plates.

At the same time, it must be borne in mind that junction boxes serve important structural and safety functions, i.e., they provide support for the electrical component and also enclose the wire ends and contacts that would otherwise be exposed. The functional requirements of outlet boxes are frequently spelled out in building codes, from which deviation is neither desirable nor practical. Consequently, any aesthetic improvement cannot be made at the expense of violating codes or compromising the functions of the outlet box itself.

For buildings that have concrete walls, a studded wall is typically built over the interior of the concrete wall, which may be insulated first or insulated between the studs, and electrical outlet boxes are mounted to the studs in the manner described above for outlets and switches. Accordingly, there exists a need for a method and apparatus that enables an electrical outlet, switch or other component to be installed in a concrete wall without the presence of a visible cover plate. Furthermore, there exists a need for such a method and apparatus that yields an aesthetically satisfactory result with quick and efficient installation while complying with applicable building codes.

DETAILED DESCRIPTION

The following detailed description will illustrate the general principles of the invention, examples of which are additionally illustrated in the accompanying drawings. In the drawings, like reference numbers indicate identical or functionally similar elements.

As used in this description and the appended claims, the terms "outlet box" and "junction box" are interchangeable and include all forms of housings that contain electrical components having portions that are exposed at the surface of a wall. As used, herein, electrical outlet, includes electrical plugs, electrical ports, including but not limited to, ethernet ports, any type of USB ports (USB-A, USB-B, USC-C, mini-USB, micro-USB), lightning or thunderbolt ports, VGA ports, Qi wireless, coax cable, HDMI ports, audio jack, telephone landline ports, display ports, any commercially available ports and plugs and any developed herein after, see FIG. 15. Furthermore, the term "wall" includes not only structures having vertical surfaces, but also angled, contoured and horizontal surfaces, such as a concrete or wooden floor in which an outlet box is set, for example.

Figure 12:
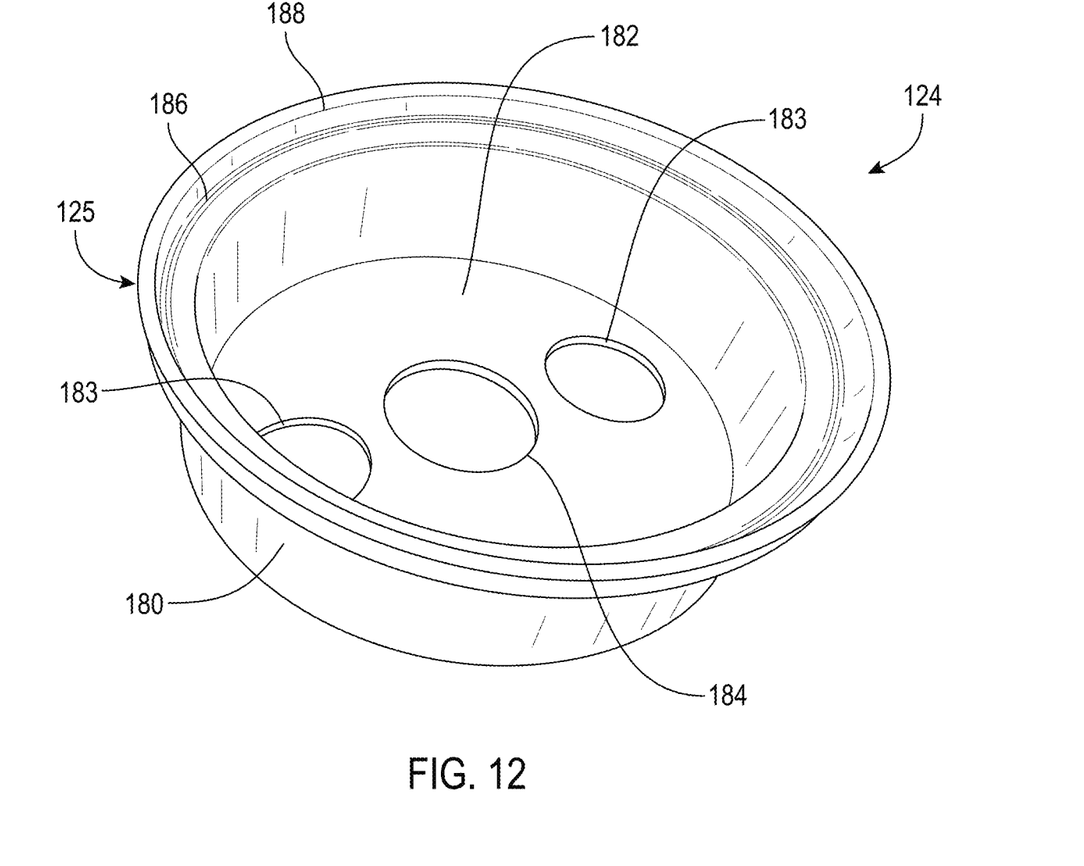
FIG. 12 is a photograph of the silicone cap from a bottom perspective view.
Figure 13:
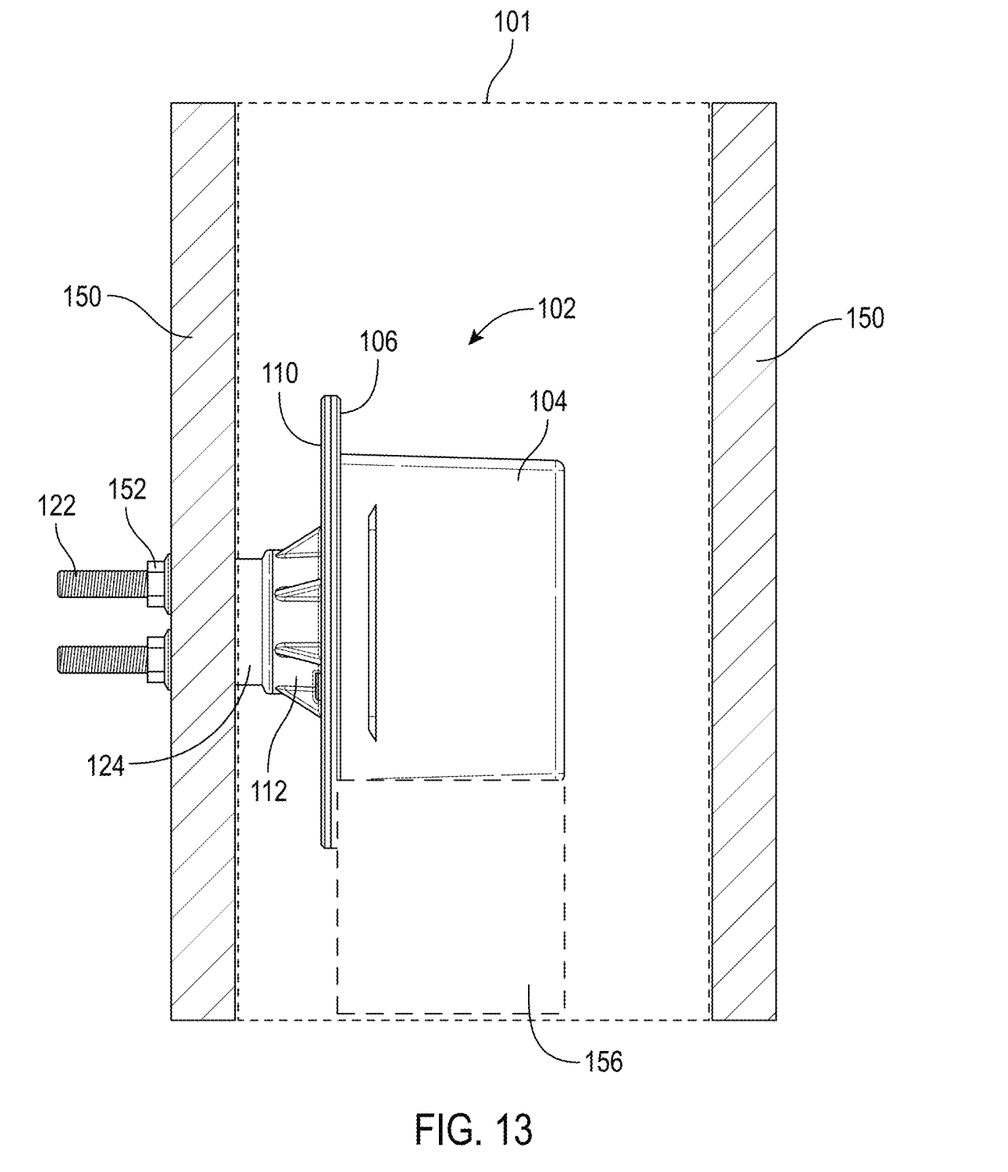
FIG. 13 is a representation of the electrical junction box mounted to a concrete form.
Figure 14:
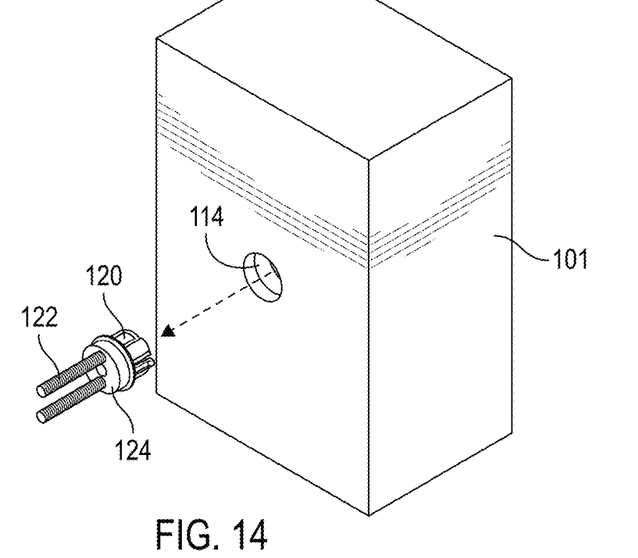
FIG. 14 is side perspective view of formed concrete encasing the electrical junction box with the removable blank removed therefrom.

Referring to FIGS. 1-14, a system 100 is disclosed for mounting an electrical junction box assembly 102 in a surface of a concrete structure 101 (shown in FIGS. 13 and 14). The electrical junction box assembly 102 has a junction box 104 having a closure plate 106 that defines a first through hole 108 (visible in the embodiment of FIG. 4, which has two first through holes 108) configured to receive an electrical switch or electrical outlet (exemplified in U.S. Pat. No. 8,232,482, which is incorporated herein by reference in its entirety) and has a secondary plate 110 mounted directly to the closure plate 106. In one embodiment, the secondary plate 110 and the closure plate 106 are mounted to the junction box 104 by one or more fasteners 111, such as screws. The secondary plate 110 has a forward protruding flange 112 defining a second through hole 114, which is aligned with the first through hole 108. The forward protruding flange 112 can have a plurality of ribs 118 spaced apart and extending radially outward therefrom. A removable blank 120 is seated in the second through hole 114 and has a bolt 122 extending therethrough and protruding forward a distance sufficient to mount to a concrete form 150.

The bolt 122, after passing through a bore 151 in the concrete form 150, receives a fastener 152. In one embodiment, the bolt is a threaded bolt and receives a threaded bolt or threaded wing nut. In another embodiment, the bolt 112 may have a plurality of holes instead of threading to receive a cotter pin fastener. The junction box 104 can include a mounting tab 105 extending therefrom and comprising one or more bores 107 configured to receive a fastener such as a nail, screw, or bolt for connecting the junction box to a framing member of a building structure.

Figure 1:
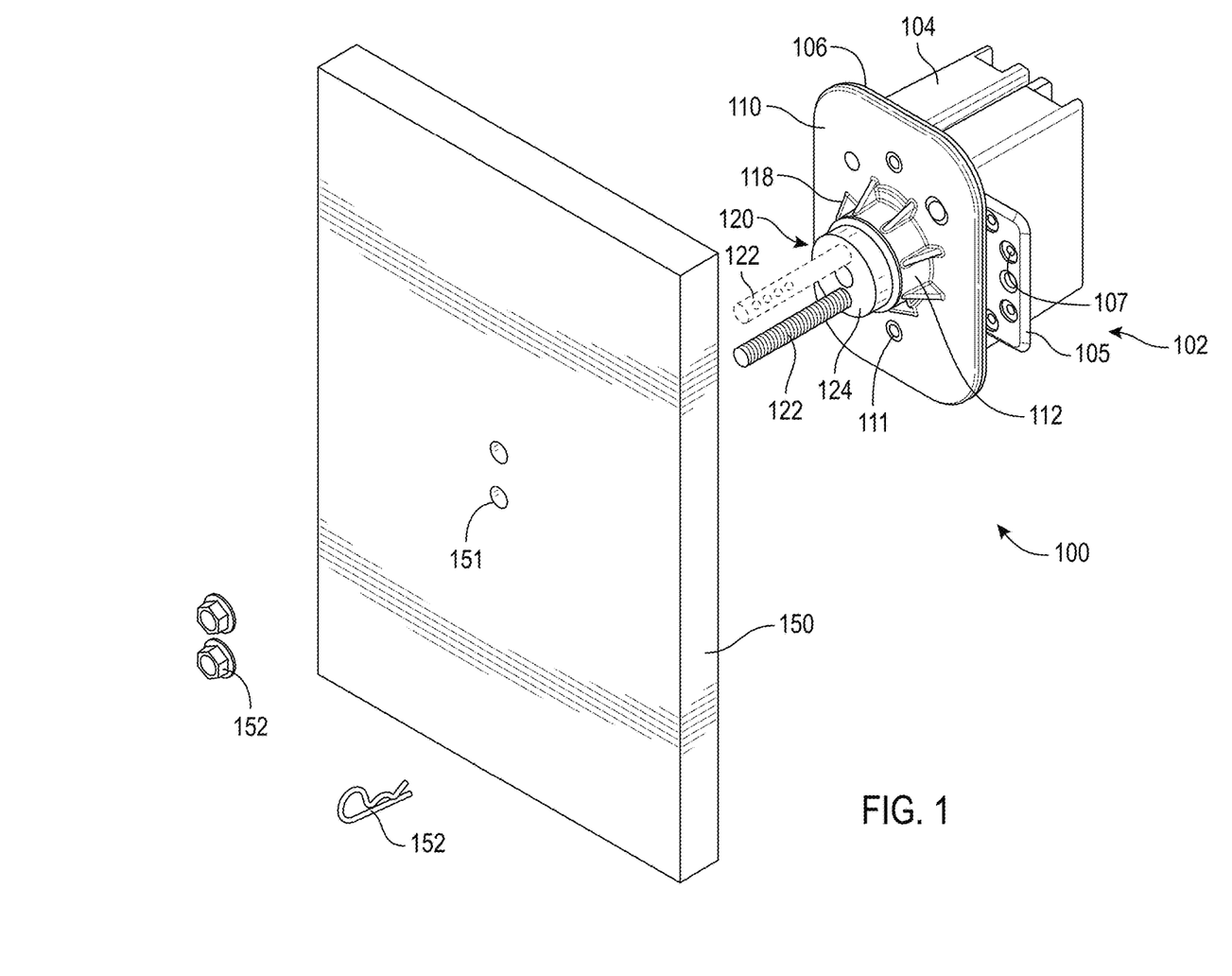
FIG. 1 is a perspective view of a concrete-mountable electrical junction box facing a concrete form and ready to receive threaded fasteners.
Figure 2:
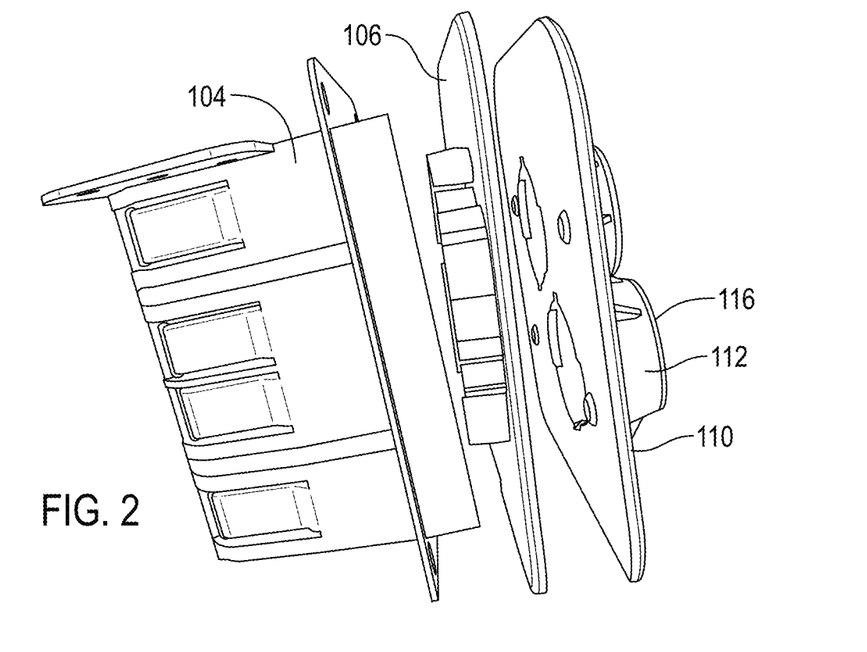
FIG. 2 is a photograph representing a side exploded view of the electrical junction box without the removable blank.
Figure 3:
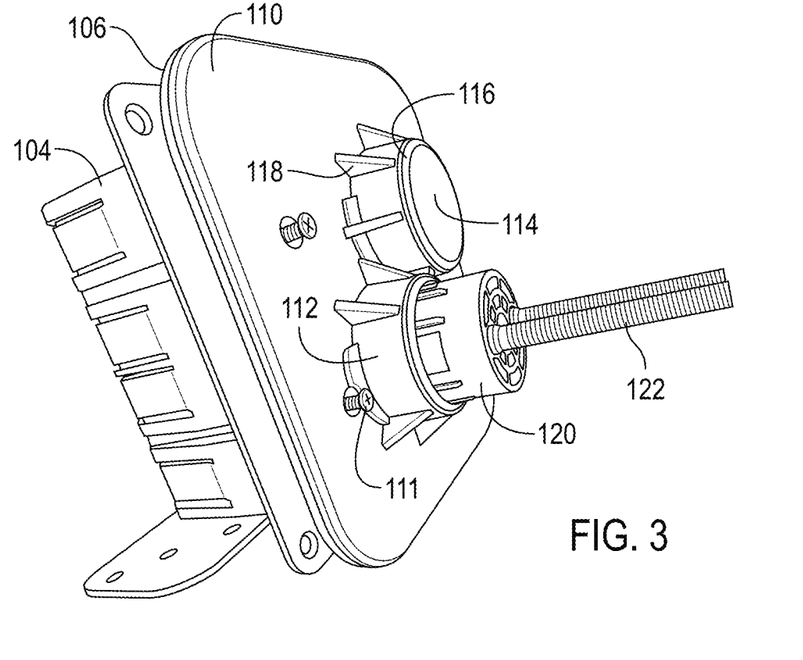
FIG. 3 is a photograph of the electrical junction box with the secondary plate with screws partially threaded therein with a removable blank partially inserted into the secondary plate.
Figure 5:
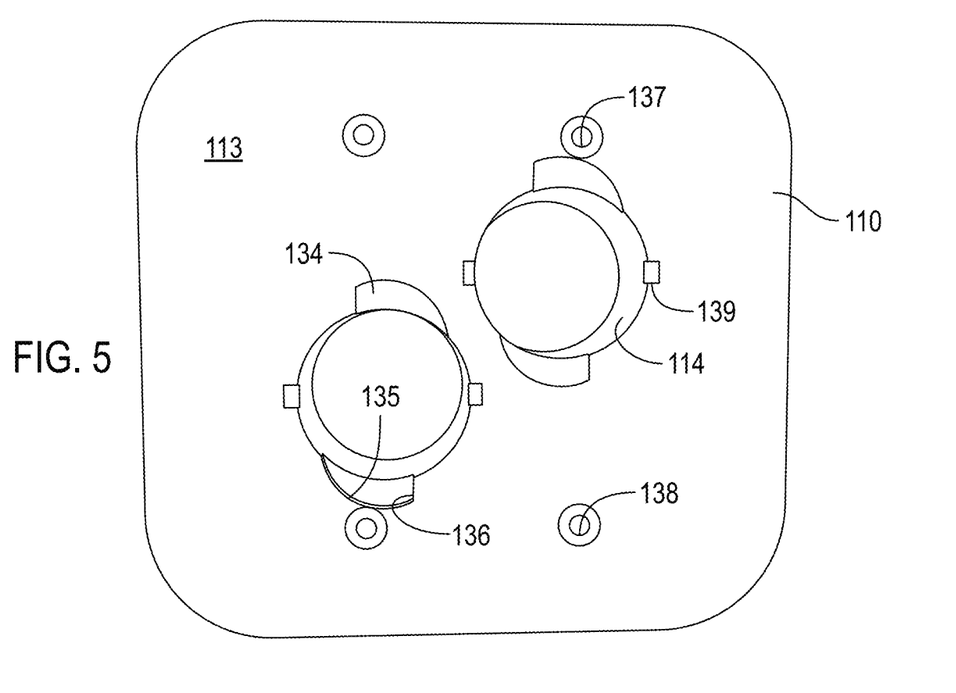
FIG. 5 is a photograph of the back face of the secondary plate.

As best seen in FIGS. 2, 3, and 5, the forward protruding flange 112 terminates with a smaller outer diameter portion 116 to define a sealing surface upon which a rim 125 of a silicon cap 124 is seated. The silicone cap 124, shown in FIGS. 1 and 12-14, is seated over the threaded bolt(s) 122 and the removable blank 120 in an engaged relationship with the forward protruding flange 112 of the secondary plate 110.

Figure 4:
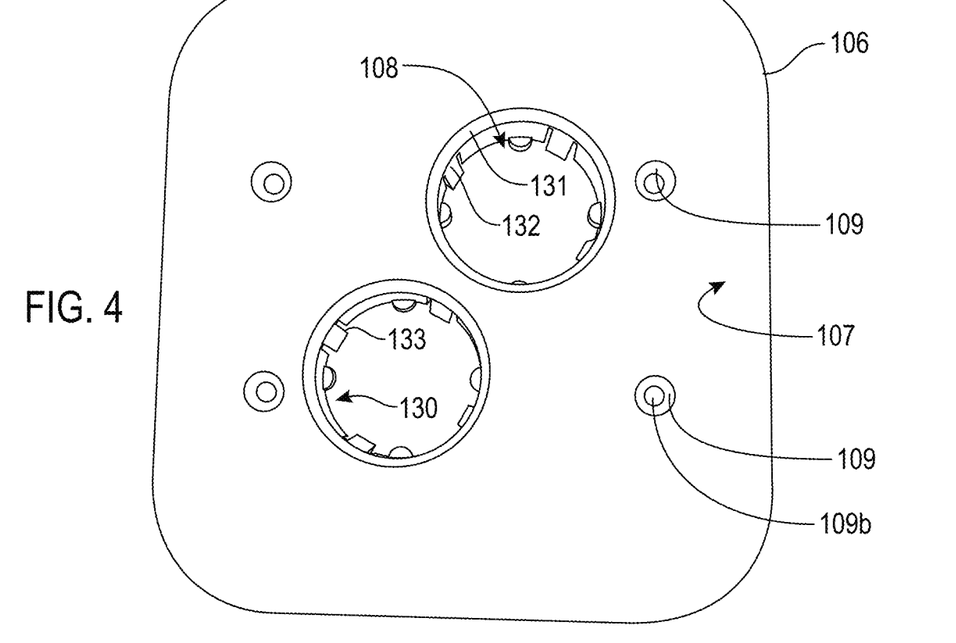
FIG. 4 is a photograph of the front face of the closure plate.

Turning now to FIG. 4, an embodiment of a closure plate 106 is shown that has two through holes 108 oriented in an angular offset arrangement. The closure plate is not limited thereto, and as shown in FIG. 1 can have a single through hole 108. Other embodiments of closure plates having various orientations for the through holes are provided in U.S. Pat. No. 8,232,482. The closure plate 106 has a generally flat, planar front surface 107 for lying flat against the secondary plate 110. The closure plate 106 includes one or more screw holes 109 for mounting the assembly to the front of the junction box 104, which are each countersunk to define a countersink portion 109b in the front surface 107. The closure plate 106 has at least one collar 130 protruding rearwardly into the junction box 104 when mounted thereto. Each collar 130 comprises a segmented annular flange that defines the first through hole 108 and is configured to receive a body of an electrical switch or electrical outlet. In the embodiment of FIG. 4, the collar 130 defines a cylindrical passage, but is not limited thereto. Any geometric shape is possible for the through hole 108.

Each collar 130 can have a plurality of wall segments 131 and a plurality of locking tabs 132, which can be in an alternating pattern. Each of the plurality of wall segments 131 can include outwardly extending strengthening ribs, similar to those shown for the flange 112 of the secondary plate. Each locking tabs 132 is oriented at an angle relative to the closure plate placing a terminal end 133 of the locking tab 132 in the first through hole 108. As such, when an electrical switch or electrical outlet is placed in the first through hole 108, the locking tabs 132 will be flexed radially outward and lock thereagainst. Suitable electrical switches and electrical outlets are described in U.S. Pat. No. 8,232, 482 and are commercially available from the Applicant under the brand names Series 22.

Figure 6:
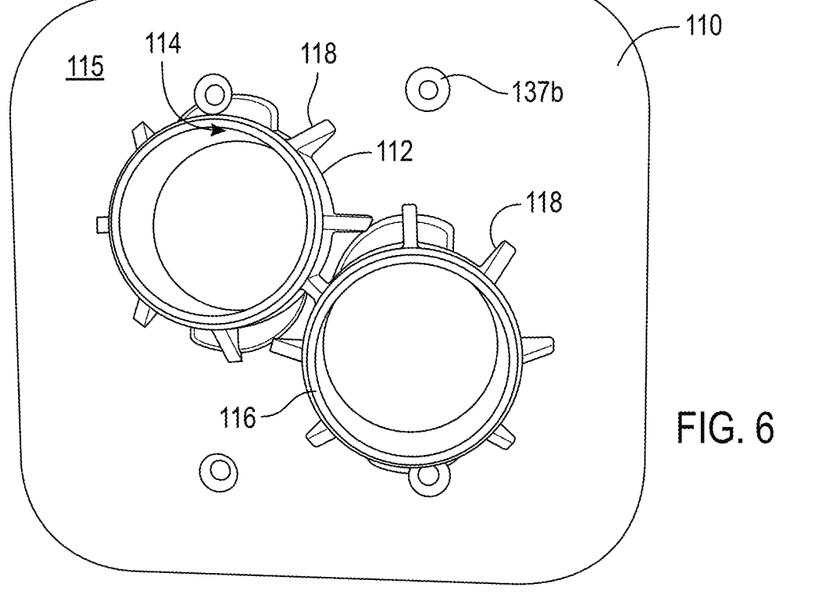
FIG. 6 is a photograph of the front face of the secondary plate.

Turning now to FIGS. 5 and 6, an embodiment of the secondary plate 110 that matches the number and orientation of first through holes 108 of the closure plate 106 of FIG. 4 is shown. FIG. 5 shows the rear surface 113 which comprises a recess 134 therein that extends from the second through hole 114 in a radial outward direction. The recess 134 is shaped to receive a foot 123 of the bolt 122, shown in FIG. 7, to define a latched position, shown in FIG. 11, for the removable blank 120. The recess 134 has an arcuate wall 135 extending from the second through hole 108 that terminates with the straight wall 136 leading back to the second through hole, where the straight wall functions as a stop for the foot 123 of the bolt in the latched position. The rear surface 113 also defines one or more fastener holes 137 each having a rearward protruding flange 138 shaped to seat in the respective countersink portion 109b of one of the fastener holes 109 of the closure plate 106, thereby registering the secondary plate 110 to the closure plate 106. The rear surface 113 can also include a notch 139 that extends radially outward from the second through hole 114, wherein the notch is shaped to receive a tab 162 extending radially outward from the removable blank 120.

FIG. 6 shows the front surface 115 of the secondary plate 110. As described above, has a forward protruding flange 112 defining the second through hole 114, which is alignable with the first through hole 108 of the closure plate 106. The forward protruding flange 112 can have a plurality of ribs 118 spaced apart and extending radially outward therefrom. The forward protruding flange 112 terminates with a smaller outer diameter portion 116 to define a sealing surface upon which a rim 125 of a silicon cap 124 is seated. The front surface 115 of the secondary plate 110 includes a countersink portion 137b for each fastener hole 137.

Figure 7:
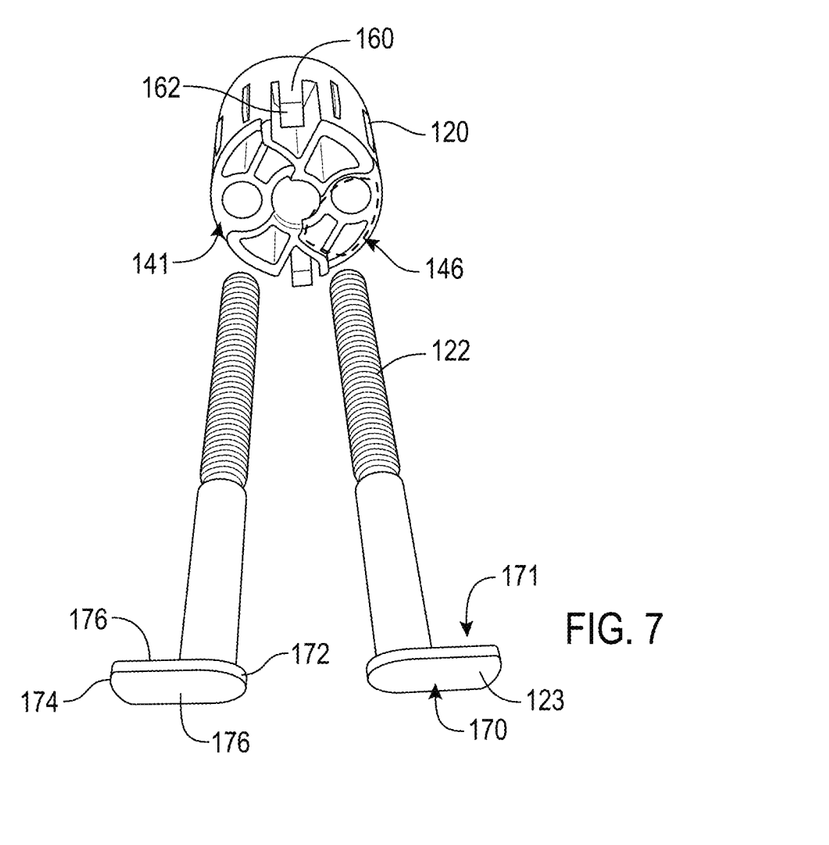
FIG. 7 is a photograph of the removable blank and two threaded bolts.

As shown in FIG. 7, the foot 123 of the bolt 122 has a flat, planar bottom surface 170, a flat planar top surface 171, and a side surface 172 at the heel of the foot 123 is arcuate shaped and a side surface 174 at the toe of the foot is less arcuate than the side surface 172 at the heel. The side surface 172 at the heel is approximately 90 degrees to 180 degrees of a circle and as viewed from the bottom surface defines a general U-shape when the opposing side surfaces 176 of the foot are included.

Figure 8:
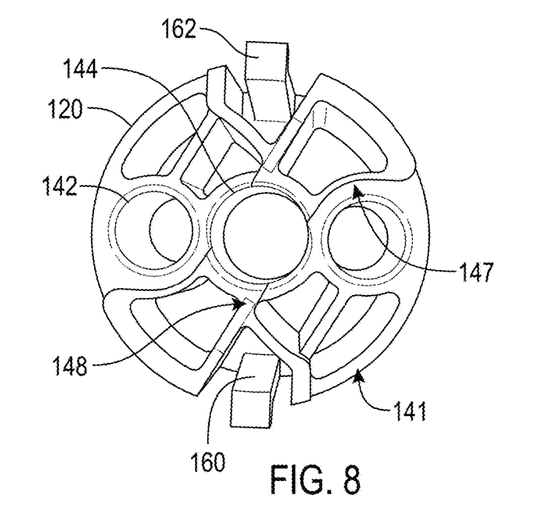
FIG. 8 is a photograph of the back end of the removable blank.
Figure 9:
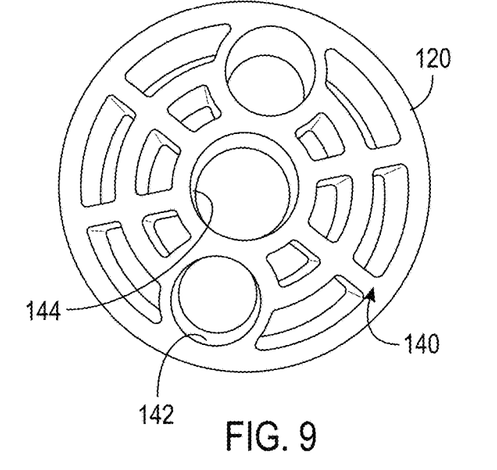
FIG. 9 is a photograph of the front end of the removable blank.
Figure 10:
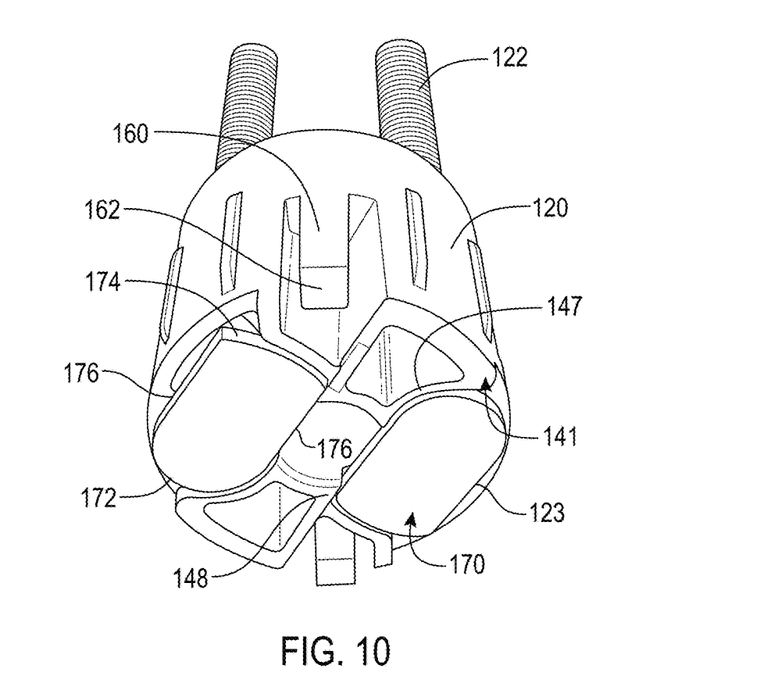
FIG. 10 is a photograph of the back end of the removable blank with the foot of each threaded bolt seated in a respective pocket defined therein.
Figure 11:
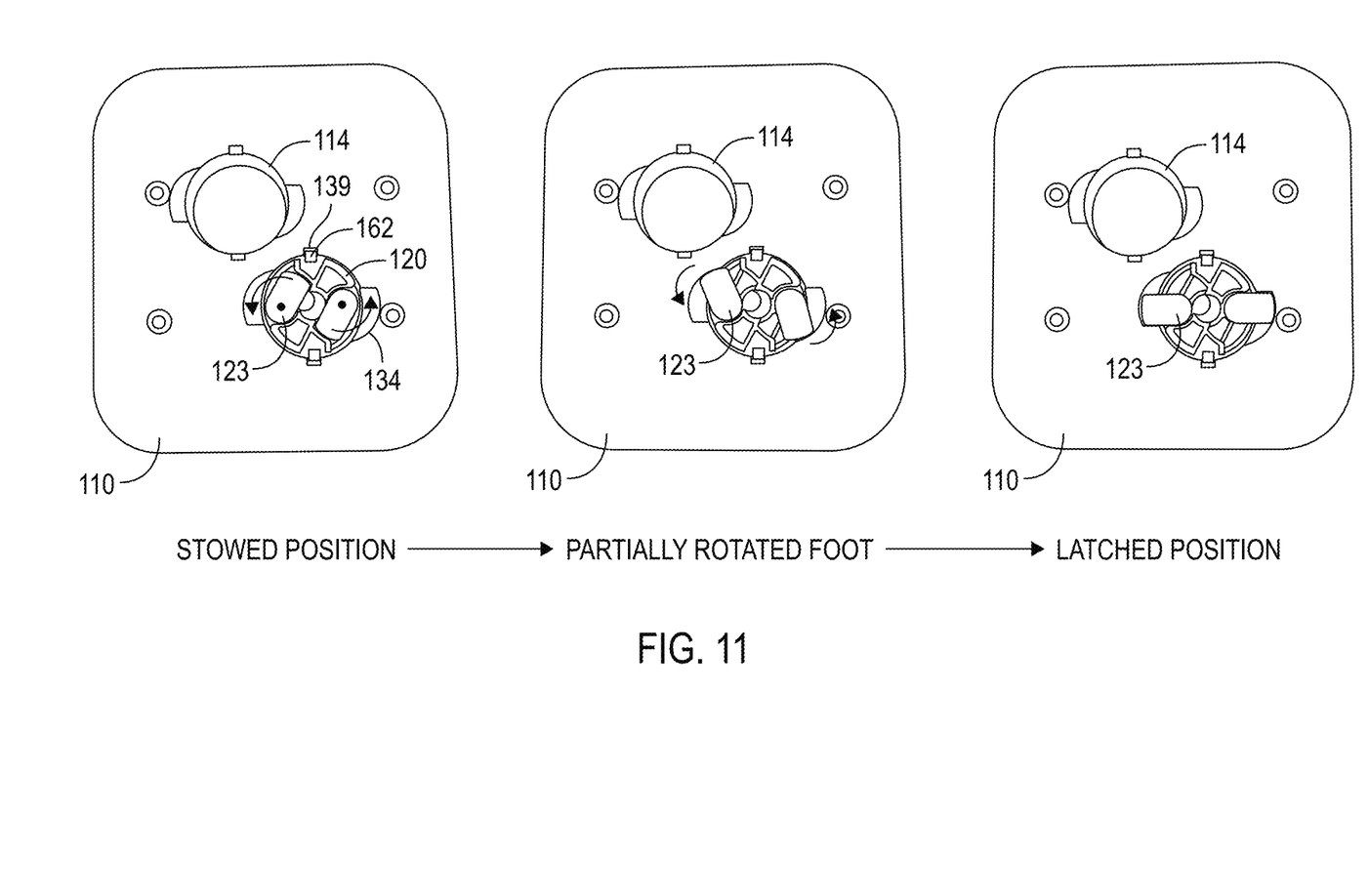
FIG. 11 is a series of photographs showing progression of the rotation of each foot from its stowed position in a pocket of the removable blank to a latched position.

Turning now to FIGS. 7-10, a removable blank 120 will be described in more detail. Starting with FIG. 9, a front end 140 of the removable blank 120 is shown. The blank includes at least one bore 142 for a bolt and, optionally, a bore 144 for wiring to extend from the junction box 104 through the removable blank. The bore 144 for wiring may be positioned as a central bore. In the embodiment of FIG. 9, two bores 142 for bolts are present, aligned and opposite one another relative to the central bore. The rear end 141, as shown in FIGS. 7, 8, and 10, defines a pocket 146 for the foot 123 of the bolt 122, represented generally by dashed lines in FIG. 7, to stow the foot 123 inside the perimeter of the rear surface as shown in FIGS. 10 and 11. The pocket 146 is defined by an interior arcuate boundary 147 and an abutment stop 148, labeled in FIGS. 8 and 10. The abutment stop 148 is generally L-shaped and is oriented with the longer leg of the L-shape oriented radially outward. As best seen in FIG. 8, the bore 142 configured to receive the bolt is positioned more proximate the interior arcuate boundary 147. The removable blank 120 also has a depressible arm 160 oriented axially at a radial exterior surface thereof. The depressible arm 150 terminates with the tab 162.

Turning now to FIG. 11, the sequence of photographs demonstrates how the foot or feet 123 of bolt(s) 122 are rotated to moved from a stowed position, when the removable blank 120 is inserted into the second through hole 114 and the tab(s) 162 of the removable blank 120 are seated in the notch(es) 139 of the secondary plate 110, to a latched position. The bolts 122, represented by the dots in the heel portion of each foot 123, are rotated clockwise to move the toe portion of each foot 123 radially outward into the recess 134 until the latched position is achieved. The center image of FIG. 11 represents a position in which each foot 123 is partially rotated into its respective recess 134. The latched position shows each foot 123 engaged against the straight wall 136 of the respective recess 134 to stop the rotation of the foot 123. This engages the foot behind the rear surface 113 of the secondary plate in a trapped relationship between the secondary plate 110 and the closure plate 106 such that the removable blank 120 can no longer be pulled out of the second through hole 114. The bolts 122, and hence the feet 123, can be rotated simultaneously or sequentially from the stowed position to the latched position, and vice versa.

Turning now to FIG. 12, the silicone cap 124 is shown and described from its rear side. The silicone cap has a cap body 180 that has a top 182 which defines a hole 183 configured to receive a bolt and will have one hole for each bolt present in the electrical junction box assembly 102. The top can also have a hole 184 that aligns with the hole in the removable blank that is configured to receive wiring. The hole 184 may have a larger diameter than the holes 183. The cap body 180 terminates at its open end with a rim 125 configured to mate and seat on the terminal end of the protruding flange 112 of the secondary plate 110. The rim 125 comprises a shoulder 186 extending radially outward about the periphery of the cap body and has a flange 188 extending in an axially direction away from the shoulder toward the junction box 104 in the assembled state.

Figure 15:
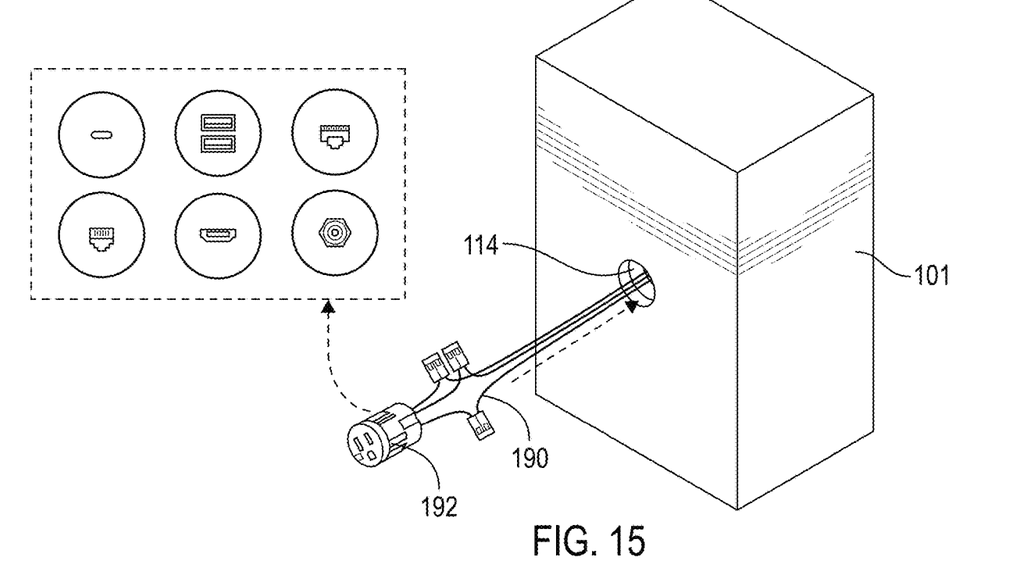
FIG. 15 is side perspective view of the formed concrete showing installation of an electrical socket.
Figure 16:
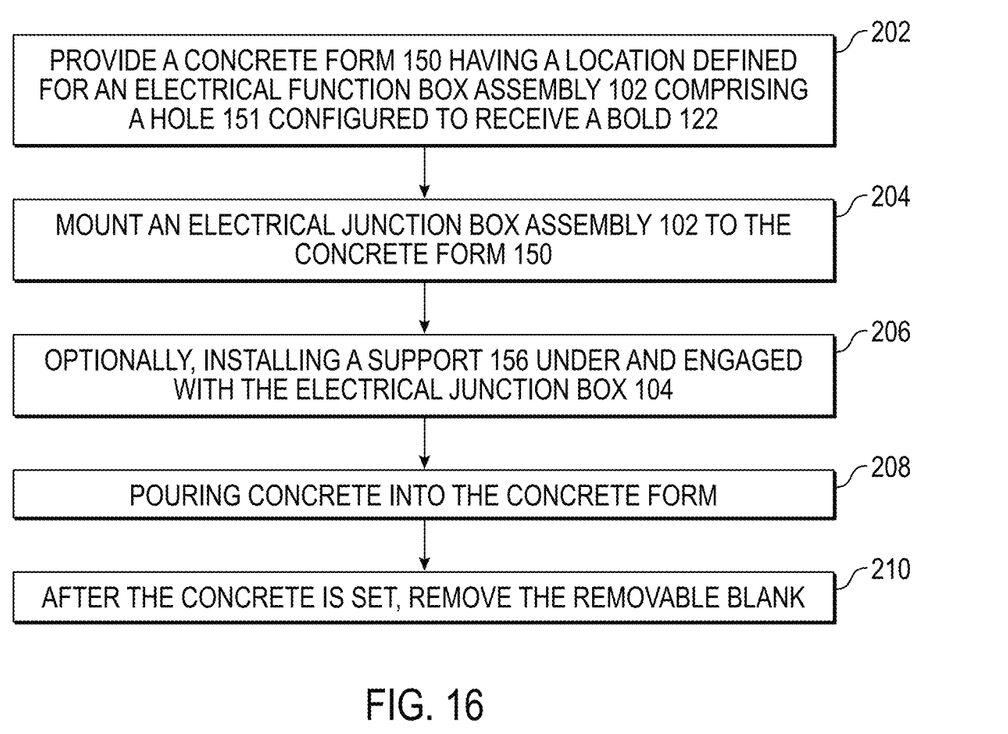
FIG. 16 is a flow chart of a method for installing an electrical junction box assembly for inclusion concrete is poured to form a cured/set concrete surface.

Turning next to FIGS. 13-15, a method for forming a concrete surface having an electrical junction box assembly 102 cured therein is disclosed. The method includes providing a concrete form 150 having a location defined for an electrical junction box assembly 102 comprising a hole 151 (shown in FIG. 1) configured to receive a bolt 122; mounting an electrical junction box assembly 102, described in detail above, to the concrete form 150; optionally, installing a support 156 under and engaged with the electrical junction box 104; pouring concrete 101 into the concrete form 150, thereby surrounding the electrical junction box assembly 102 with concrete; and after the concrete is set, removing the concrete form 150 and the removable blank 120. The flow chart of FIG. 16 represents the above in sequence from box 202 through box 210. Referring now to FIG. 15, after removal of the blank 102, the junction box 104 is ready to receive electrical wires 190, if wiring was not pre-run into the junction box 104 and through the bore 144 of the removable blank 120. As such, the method can include either running wire to the junction box before concrete is poured or after the concrete is set. Lastly, an electrical switch or electrical outlet 192 is connected to the wiring and is set in the second through hole 114 of the secondary plate with the face thereof flush with the surface of the concrete structure.

Mounting 204 the electrical junction box assembly can include threading a threaded fastener, such as a bolt, onto a bolt, which is likewise threaded until engaged with the concrete form. Mounting 204 also includes rotating each bolt 122 to move the toe portion of each foot 123 into the latched position before securing a fastener to each bolt.

The method can also include assembling the electrical junction box assembly 102. This includes seating a secondary plate in registration with the closure plate and then fastening the two to the junction box. Next the bolts are inserted into the removable blank with each foot seated in a respective pocket in the rear surface of the blank. The compressible arm(s) of the removable blank are depressed as the removable blank is inserted into the second through hole of the secondary plate. The removable blank is inserted until the tabs of the depressible arms are seated in the notches in the rear surface of the secondary plate. Next, the silicone cap can be seated over the threads and into engagement with the protruding flange of the secondary plate or the silicone cap can be seated thereon before insertion into the second through hole.

The removable blank comprises a silicone cap seated over the bolt and seated in an engaged relationship with the forward protruding flange of the secondary plate, mounting comprises fastening the removable blank to the concrete form with the silicone cap covered end of the removable blank against the concrete form. The removable blank comprises a central through bore, and the method includes running wires into the junction box and through the central bore of the blank and through the concrete form before pouring concrete.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A system for mounting an electrical junction box in a surface of a concrete structure comprising:
    an electrical junction box having a closure plate that defines a first through hole configured to receive an electrical switch or electrical outlet;

a secondary plate mounted directly to the closure plate, wherein the secondary plate has a forward protruding flange defining a second through hole aligned with the first through hole; and a removable blank seated in the second through hole and having a bolt extending through the removable blank and protruding forward a distance sufficient to mount to a concrete form.

2. The system of claim 1, wherein the removable blank comprises a silicone cap seated over the bolt and seated in an engaged relationship with the forward protruding flange of the secondary plate.

3. The system of claim 2, wherein the forward protruding flange terminates with a smaller outer diameter to define a sealing surface upon which a rim of the silicon cap is seated.

4. The system of claim 1, wherein the bolt is a threaded bolt and the system further comprising a threaded fastener receivable on the threaded bolt.

5. The system of claim 1, wherein the bolt terminates with a foot.

6. The system of claim 5, wherein a rear surface of the secondary plate comprises a recess therein that extends from the second through hole in a radial outward direction and the recess is shaped to receive the foot of the bolt to define a latched position for the removable blank.

7. The system of claim 6, wherein a rear surface of the removable blank defines a pocket for the foot of the bolt to lie inside the perimeter of the rear surface.

8. The system of claim 1, wherein the removable blank comprises a central through bore.

9. The system of claim 1, wherein the closure plate comprises a fastener hole that is countersunk into a front surface thereof, and a rear surface of the secondary plate comprises a fastener hole having a rearward protruding flange shaped to seat in the countersunk space of the closure plate, thereby registering the secondary plate to the closure plate.

10. The system of claim 1, wherein the secondary plate, in a rear surface thereof, comprises a notch in a rear surface thereof that extends radially outward from the second through hole, wherein the notch is shaped to receive a tab extending radially outward from the removable blank.

11. The system of claim 10, wherein the removable blank comprises a depressible arm oriented axially at a radial exterior surface thereof, wherein the depressible arm terminates with the tab.

12. The system of claim 1, wherein the forward protruding flange of the secondary plate comprises a plurality of ribs spaced apart and extending radially outward therefrom.

13. A system for mounting an electrical junction box in a surface of a concrete structure comprising:

a secondary plate mountable directly to a closure plate of an electrical junction box, wherein the secondary plate has a forward protruding flange defining a second through hole aligned with the first through hole and a rear surface of the secondary plate comprises a recess therein that extends from the second through hole in a radial outward direction; and a removable blank seated in the second through hole and having a bolt extending through the removable blank and protruding forward a distance sufficient to mount to a concrete form;

wherein the bolt terminates with a foot and the recess of the secondary plate is shaped to receive the foot of the bolt to define a latched position for the removable blank.

14. The system of claim 13, a silicone cap seated over the bolt and a front end of the removable blank in an engaged relationship with the forward protruding flange of the secondary plate.

15. The system of claim 14, wherein the forward protruding flange terminates with a smaller outer diameter to define a sealing surface upon which a rim of the silicon cap is seated.

16. The system of claim 13, wherein the bolt is a threaded bolt and the system further comprising a threaded fastener receivable on the threaded bolt.

17. The system of claim 13, wherein a rear surface of the removable blank defines a pocket for the foot of the bolt to lie inside the perimeter of the rear surface.

18. The system of claim 17, wherein the pocket is defined by an interior arcuate boundary and an abutment stop.

19. The system of claim 13, wherein the secondary plate, in a rear surface thereof, comprises a notch in a rear surface thereof that extends radially outward from the second through hole, wherein the notch is shaped to receive a tab extending radially outward from the removable blank.

20. The system of claim 19, wherein the removable blank comprises a depressible arm oriented axially at a radial exterior surface thereof, wherein the depressible arm terminates with the tab.

* * * * *